US006615773B2

(12) United States Patent
Moteki et al.

(10) Patent No.: US 6,615,773 B2
(45) Date of Patent: Sep. 9, 2003

(54) PISTON CONTROL MECHANISM OF RECIPROCATING INTERNAL COMBUSTION ENGINE OF VARIABLE COMPRESSION RATIO TYPE

(75) Inventors: Katsuya Moteki, Tokyo (JP); Shunichi Aoyama, Kanagawa (JP); Kenshi Ushijima, Kanagawa (JP); Ryosuke Hiyoshi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/077,944

(22) Filed: Feb. 20, 2002

(65) Prior Publication Data

US 2002/0139324 A1 Oct. 3, 2002

(30) Foreign Application Priority Data

Mar. 28, 2001 (JP) ....................................... 2001-091742

(51) Int. Cl.[7] ............................ F02D 15/02; F16C 7/00
(52) U.S. Cl. .................................. 123/48 B; 123/197.4
(58) Field of Search ............................ 123/48 B, 197.4

(56) References Cited

U.S. PATENT DOCUMENTS 4,917,066 A * 4/1990 Freudenstein et al. .... 123/48 B
5,136,987 A * 8/1992 Schechter et al. ........ 123/48 B
5,215,051 A * 6/1993 Smith ...................... 123/197.4
5,595,146 A * 1/1997 Bollig et al. .............. 123/48 B
6,202,622 B1 * 3/2001 Raquiza, Jr. ............. 123/197.4
6,202,623 B1 * 3/2001 Ehrlich .................... 123/197.4
6,491,003 B2 * 12/2002 Moteki ..................... 123/48 B
6,505,582 B2 * 1/2003 Moteki et al. ............ 123/48 B
6,510,821 B2 * 1/2003 Fujimoto et al. ......... 123/48 B

FOREIGN PATENT DOCUMENTS

JP A1 2000-73804 3/2000

* cited by examiner

*Primary Examiner*—Henry C. Yuen
*Assistant Examiner*—Jason Benton
(74) *Attorney, Agent, or Firm*—Foley & Lardner

(57) ABSTRACT

In an internal combustion engine of variable compression ratio type, a piston control mechanism is employed which comprises a lower link rotatably disposed on a crank pin of a crankshaft of the engine, an upper link having one end pivotally connected to the lower link and the other end pivotally connected to a piston of the engine, a control link having one end pivotally connected to the lower link; and a position changing mechanism which changes a supporting axis about which the other end of the control link turns. When the piston comes up to a top dead center, a compression load is applied to the control link in an axial direction of the control link in accordance with an upward inertial load of the piston.

12 Claims, 12 Drawing Sheets

14
15
19(17)
21
22
23
24
25
D1
D2
D3
( COMPRESSED CONDITION )
( NEUTRAL CONDITION )
( EXTENDED CONDITION )

PISTON CONTROL MECHANISM OF RECIPROCATING INTERNAL COMBUSTION ENGINE OF VARIABLE COMPRESSION RATIO TYPE

BACKGROUND OF INVENTION

1. Field of Invention

The present invention relates in general to reciprocating internal combustion engines of a variable compression ratio type that is capable of varying a compression ratio under operation thereof and more particularly to the reciprocating internal combustion engines of a multi-link type wherein each piston is connected to a crankshaft through a plurality of links. More specifically, the present invention is concerned with a piston control mechanism of such internal combustion engines.

2. Description of Related Art

In the field of reciprocating internal combustion engines, there has been proposed a variable compression ratio type that is capable of varying a compression ratio of the engine in accordance with operation condition of the same. One of such engines is shown in Laid-Open Japanese Patent Application (Tokkai) 2000-73804. The engine of the publication employs a piston control mechanism wherein each piston is connected to a crankshaft through a plurality of links.

For ease of understanding of the present invention, the piston control mechanism of the publication will be briefly described with reference to FIG. 12 of the accompanying drawings.

In the drawing, denoted by numeral 101 is a crankshaft having crank pins 102. To each crank pin 102, there is pivotally connected a lower link (floating lever) 103 at a middle portion thereof. To one end of lower link 103, there is pivotally connected a lower end of an upper link 106 through a first connecting pin 110. An upper end of the upper link 106 is pivotally connected to a piston 104 through a piston pin 105. To the other end of lower link 103, there is pivotally connected a lower end of a control link 107 through a second connecting pin 111. An upper end of control link 107 is pivotally connected to an eccentric pin 109 of a control crankshaft 108. More specifically, the lower and upper ends of control link 107 are formed with respective cylindrical bearing bores which pivotally receive second connecting pin 111 and eccentric pin 109 respectively. Under operation of the engine, control crankshaft 108 is turned in accordance with operation condition of the engine, causing control link 107 to vary and set pivoting movement of lower link 103 thereby varying or setting a stroke of the piston 104. With this operation, the compression ratio of the engine is varied in accordance with the engine operation condition.

SUMMARY OF INVENTION

In the piston control mechanism as mentioned hereinabove, based on both an upward inertial load applied to piston 104 when piston 104 moves upward and a downward load applied to the same when combustion takes place, a certain load is inevitably applied to control link 107 through upper link 106 and lower link 103. In control links like the control link 107 of which both ends are formed with cylindrical bearing bores, it is known that an elastic deformation appearing on control link 107 when a tensile load is applied thereto is greater than that appearing when a compression load is applied thereto. That is, variation of effective length of control link 107 in case of receiving the tensile load is larger than that in case of receiving the compression load. That is, in case of the compression load, only a shaft portion proper of control link 107 defined between the two cylindrical bearing bores is subjected to an elastic deformation, while, in case of tensile load, the entire length of control link 107 including the two thinner cylindrical bearing bores is subjected to the elastic deformation inducing the increase in elastic deformation degree.

When piston 104 comes up to a top dead center (TDC) on exhaust stroke, upward inertial load of piston 104 brings the crown of the same into a position closest to intake and exhaust valves. Furthermore, when, due to valve overlapping or the like, intake and exhaust valves are still open partially at such top dead center (TDC), the piston crown becomes much closer to the intake and exhaust valves. Thus, when, with piston 104 taking the top dead center (TDC) on exhaust stroke, a certain tensile load is applied to control link 107 based on the upward inertial load of piston 104, the elastic deformation of control link 107 becomes remarkable causing piston 104 to be displaced from a proper position, which tends to deteriorate engine performance. Furthermore, if the displacement of piston 104 becomes remarkably large, undesirable interference between piston 104 and intake and exhaust valves may occur.

Accordingly, an object of the present invention is to provide a piston control mechanism of reciprocating internal combustion engine, which is free of the above-mentioned undesired piston displacement.

Another object of the present invention is to provide a piston control mechanism of reciprocating internal combustion engine of variable compression ratio type, which can assuredly avoid interference between a piston and intake and exhaust valves without sacrificing engine performance, that is, without narrowing a range in which the engine compression ratio is variable.

Still another object of the present invention is to provide a piston control mechanism of reciprocating internal combustion engine of variable compression ratio type, which is compact in size and exhibits a high cost performance.

According to a first aspect of the present invention, there is provided a piston control mechanism of an internal combustion engine, the engine including a piston slidably disposed in a piston cylinder and a crankshaft converting a reciprocation movement of the piston to a rotation movement, the piston control mechanism comprising a lower link rotatably disposed on a crank pin of the crankshaft; an upper link having one end pivotally connected to the lower link and the other end pivotally connected to the piston; a control link having one end pivotally connected to the lower link; and a position changing mechanism which changes a supporting axis about which the other end of the control link turns, wherein when the piston comes up to a top dead center, a compression load is applied to the control link in an axial direction of the control link in accordance with an upward inertial load of the piston.

According to a second aspect of the present invention, there is provided a piston control mechanism of an internal combustion engine, the engine including a piston slidably disposed in a piston cylinder and a crankshaft converting a reciprocation movement of the piston to a rotation movement, the piston control mechanism comprising a lower link rotatably disposed on a crank pin of the crankshaft; an upper link having one end pivotally connected to the lower link and the other end pivotally connected to the piston; a control link having one end pivotally connected to the lower link; and a position changing mechanism including a control crankshaft which extends in parallel with the crankshaft and rotates about a given axis, the control crankshaft including a main shaft portion which is rotatable about the given axis and an eccentric pin which is radially raised from the main shaft portion, the eccentric pin being received in a cylindrical bearing bore formed in the other end of the control link, wherein when the piston comes up to a top dead center, a rotation direction of an upper link center line relative to a first direction line is equal to a rotation direction of a control link center line relative to a second direction line, the upper link center line being an imaginary line which perpendicularly crosses both a first pivot axis between the piston and the upper link and a second pivot axis between the upper link and the lower link, the control link center line being an imaginary line which perpendicularly crosses both a third pivot axis between the lower link and the control link and the supporting axis, the first direction line being an imaginary line which perpendicularly crosses both the second pivot axis and a center axis of the crank pin, and the second direction line being an imaginary line which perpendicularly crosses both the third pivot axis and the center axis of the crank pin.

DETAILED DESCRIPTION OF EMBODIMENTS

In the following, various embodiments of the present invention will be described in detail with reference to the accompanying drawings.

For ease of understanding, various directional terms, such as, right, left, upper, lower, rightward, etc., are contained in the description. However, such terms are to be understood with respect to only drawing or drawings on which corresponding part or portion is illustrated.

Furthermore, for simplification of description, throughout the description, substantially same parts and constructions are denoted by the same numerals and repeated explanation of them will be omitted.

Figure 1:
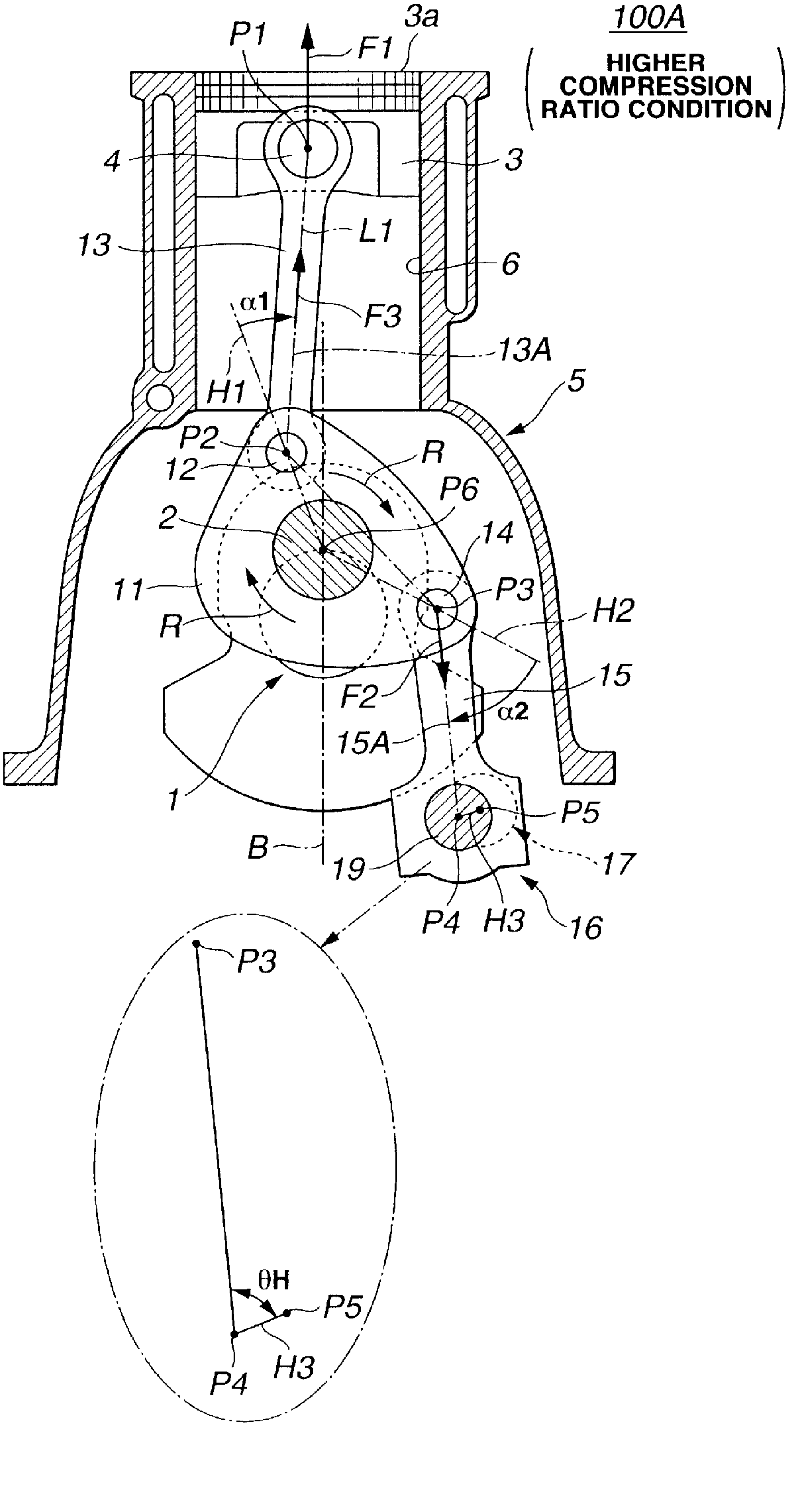
FIG. 1 is a sectional view of an internal combustion engine having a piston control mechanism of a first embodiment, showing a piston assuming a top dead center (TDC) under a higher compression ratio condition.
Figure 2:
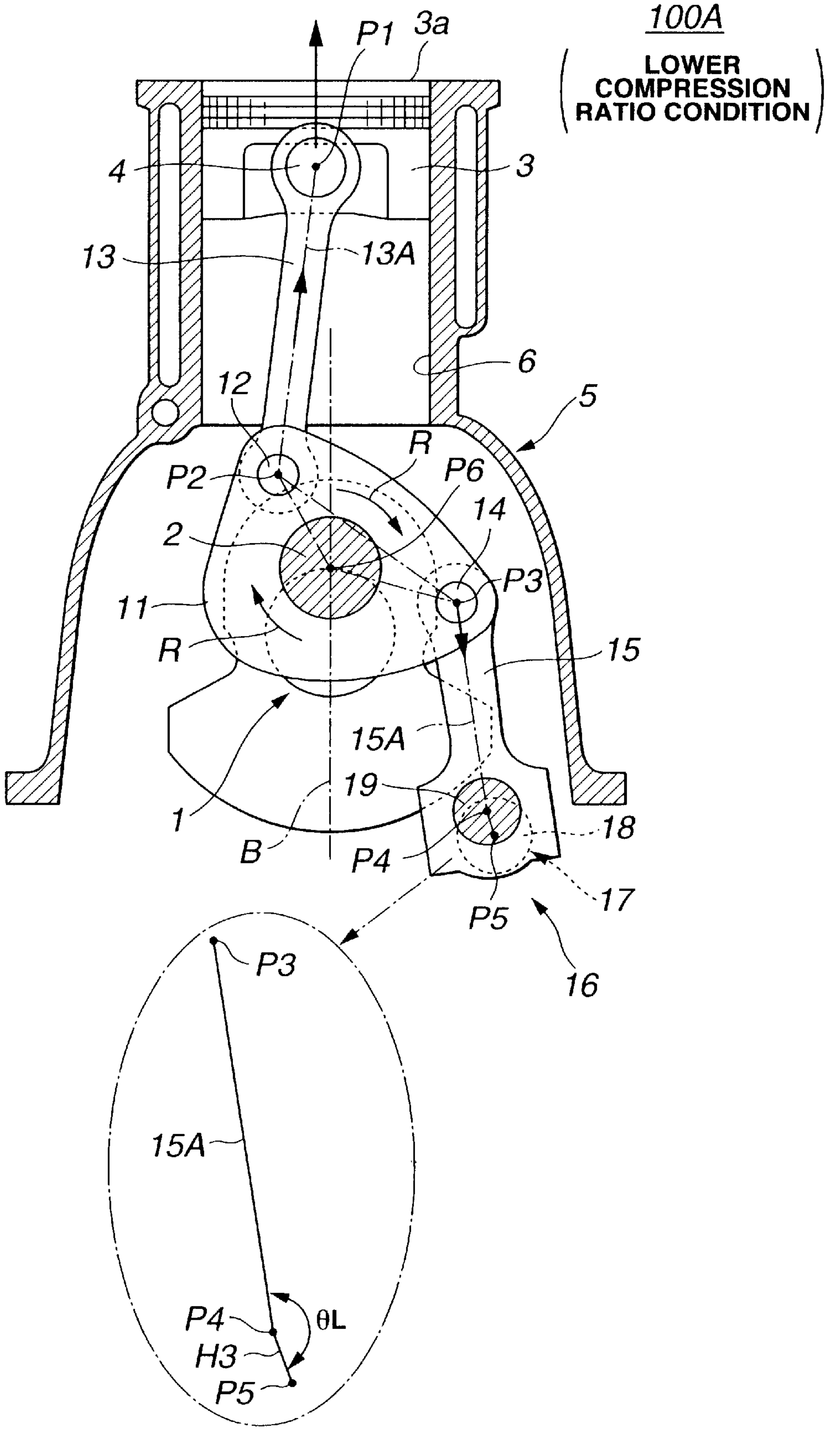
FIG. 2 is a view similar to FIG. 1, but showing the piston assuming the top dead center (TDC) under a lower compression ratio condition.

Referring to FIGS. 1 to 9A and 9B, particularly FIGS. 1 and 2, there is shown a piston control mechanism of a first embodiment of the present invention, which is applied to a reciprocating internal combustion engine of variable compression ratio type.

As is seen from FIG. 1, the piston control mechanism 100A of the first embodiment comprises a lower link 11 which is rotatably disposed on a crank pin 2 of a crankshaft 1 of an associated internal combustion engine at a center opening thereof. A center axis of crank pin 2 is denoted by reference P6. The lower link 11 is shaped generally triangle. An upper link 13 is pivotally connected at a lower end to lower link 11 through a first connecting pin 12 and pivotally connected at an upper end to a piston 3 through a piston pin 4. A center axis of first connecting pin 12 is denoted by reference P2 and a center axis of piston pin 4 is denoted by reference P1. A control link 15 is pivotally connected at an upper end to lower link 11 through a second connecting pin 14 and pivotally connected at a lower end to a body of the engine trough a position changing mechanism 16. A center axis of second connecting pin 14 is denoted by reference P3. As will be described in detail hereinafter, position changing mechanism 16 is constructed to change a supporting axis P4 about which the lower end of control link 15 turns. Thus, the degree of freedom of lower link 11 is controlled.

As shown, piston 3 is slidably received in a cylinder 6 defined in a cylinder block 5. A piston head 3*a* of piston 3 is formed with a recess that constitutes part of a combustion chamber.

The position changing mechanism 16 comprises a control crankshaft 17 which substantially extends in parallel with crankshaft 1 and an electric actuator which rotates control crankshaft 17 about its center axis P5 in accordance with an operation condition of the engine.

Figures 6A, 6B:
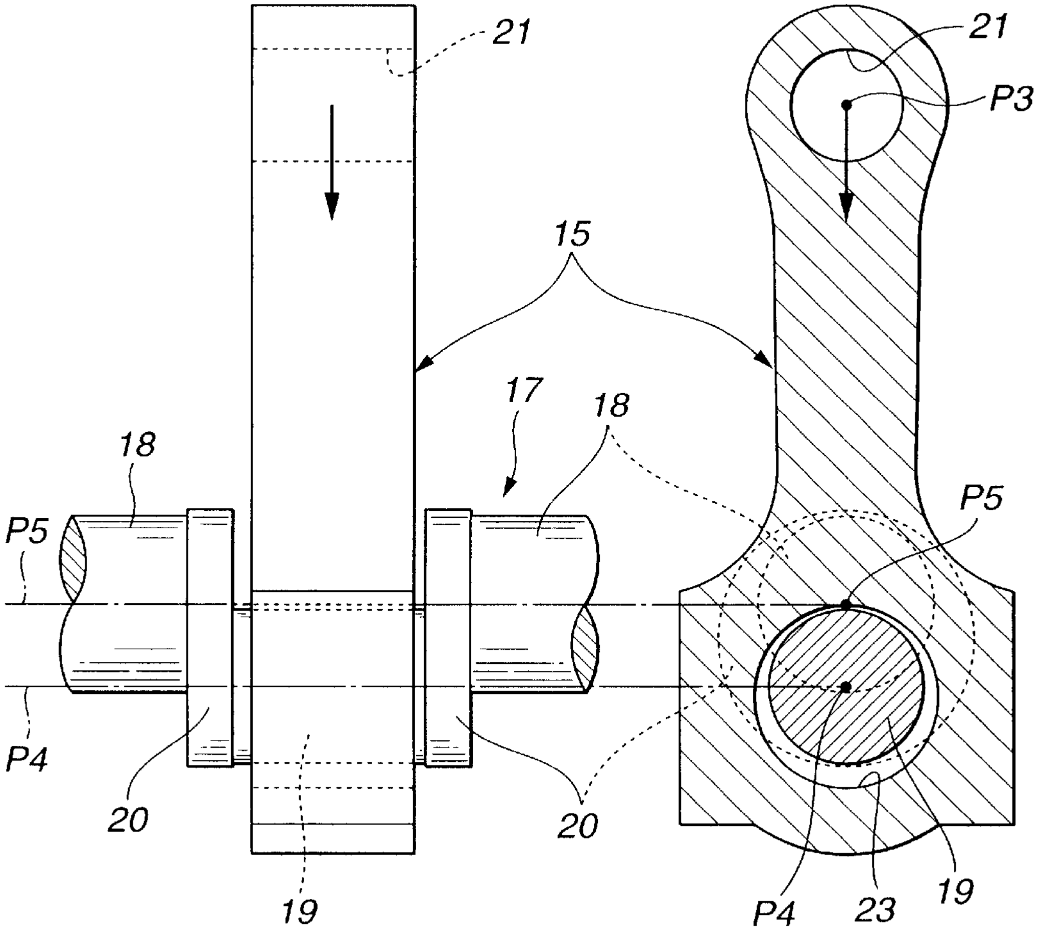
FIGS. 6A and 6B are front and sectional views of a unit including the control crankshaft and the control link, showing the bending deformation of the control crankshaft appearing when a load is applied thereto in a first direction.
Figure 7A:
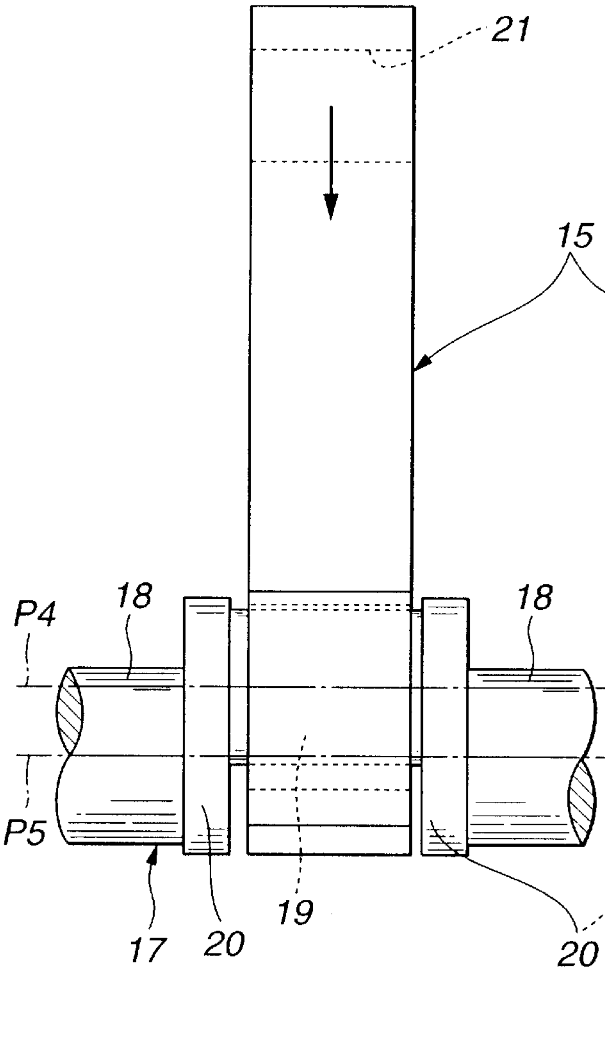
FIGS. 7A and 7B are views similar to FIGS. 6A and 6B, but showing the bending deformation of the control crankshaft appearing when a load is applied thereto in a second direction.
Figure 7B:
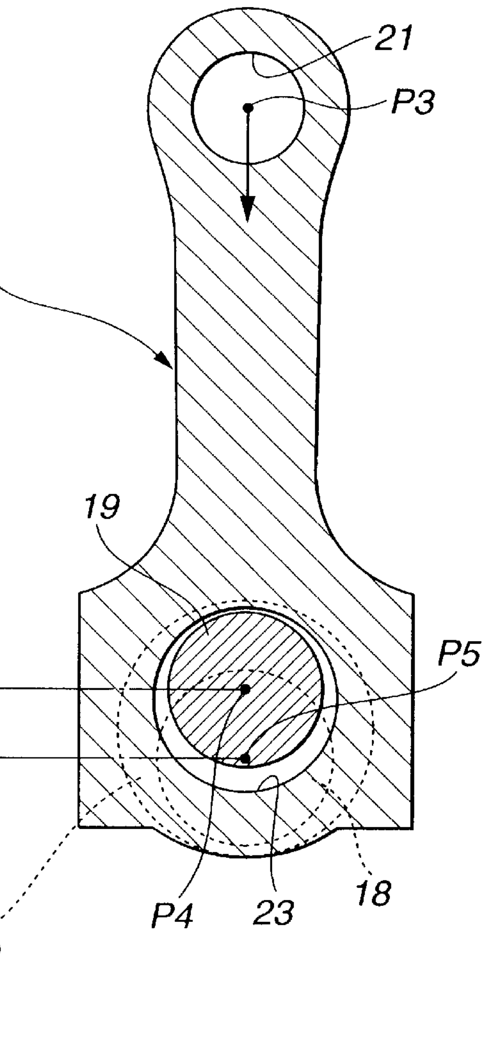
Figure 8A:
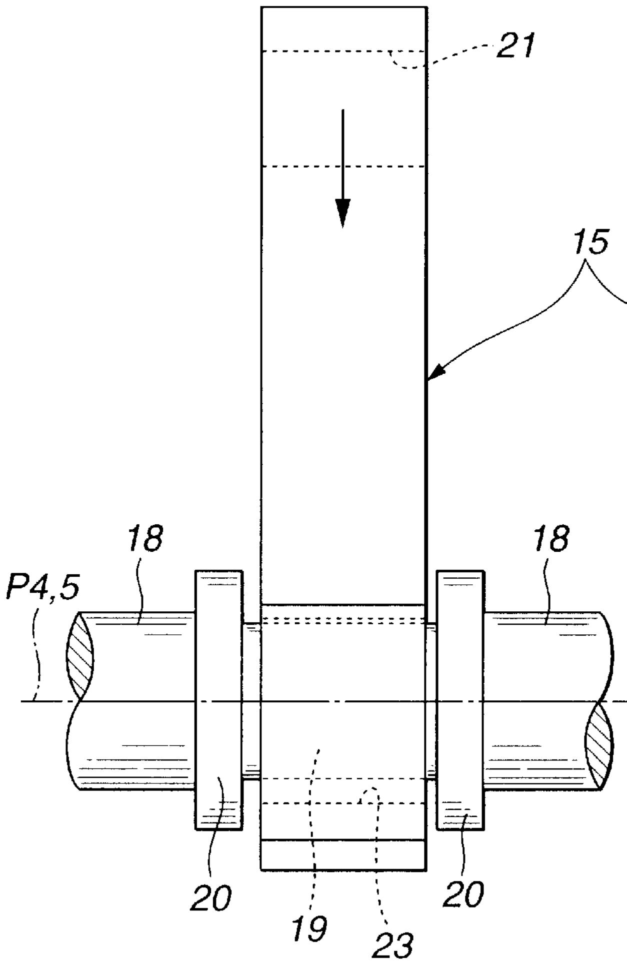
FIGS. 8A and 8B are views similar to FIGS. 6A and 6B, but showing the bending deformation of the control crankshaft appearing when a load is applied thereto in a third direction.
Figure 8B:
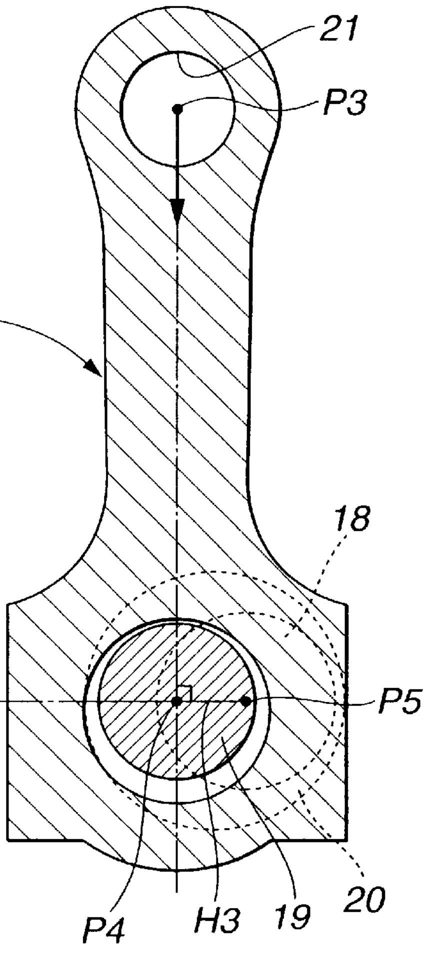

As is seen from FIGS. 6A and 6B, control crankshaft 17 comprises a main shaft portion 18 which rotates about the center axis P5, paired crank arms 20 which extend radially outward from the main shaft portion 18 and an eccentric pin 19 which is held between the paired crank arms 20 at a position eccentric to main shaft portion 18. Eccentric pin 19 is of a cylindrical solid member of which center axis P4 is the supporting axis P4 of control link 15. The cylindrical eccentric pin 19 is received in a cylindrical bearing bore 23 formed in a lower end of control link 15. (It is to be noted that FIGS. 6A and 6B (and FIGS. 7A to 8B) are exaggeratedly illustrated.) Control link 15 is formed at an upper end with a cylindrical bearing bore 21 which rotatably receives second connecting pin 14.

As is seen from FIG. 6B, the center axis P4 of the eccentric pin 19 (viz., supporting axis P4 of control link 15) is eccentric to the center axis P5 of main shaft portion 18 of control crankshaft 17.

For achieving easy mounting onto crank pin 2 and eccentric pin 19, lower link 11 and control link 15 are constructed to have a split structure.

When, in operation, control crankshaft 17 (see FIG. 1) is turned by the electric actuator about its center axis P5 in accordance with the engine operation condition, the lower end of control link 15 is subjected to position change and thus behavior of lower link 11 changes thereby to change the stroke of piston 3, resulting in that the compression ratio of the engine is varied.

Figures 3A, 3B, 3C:
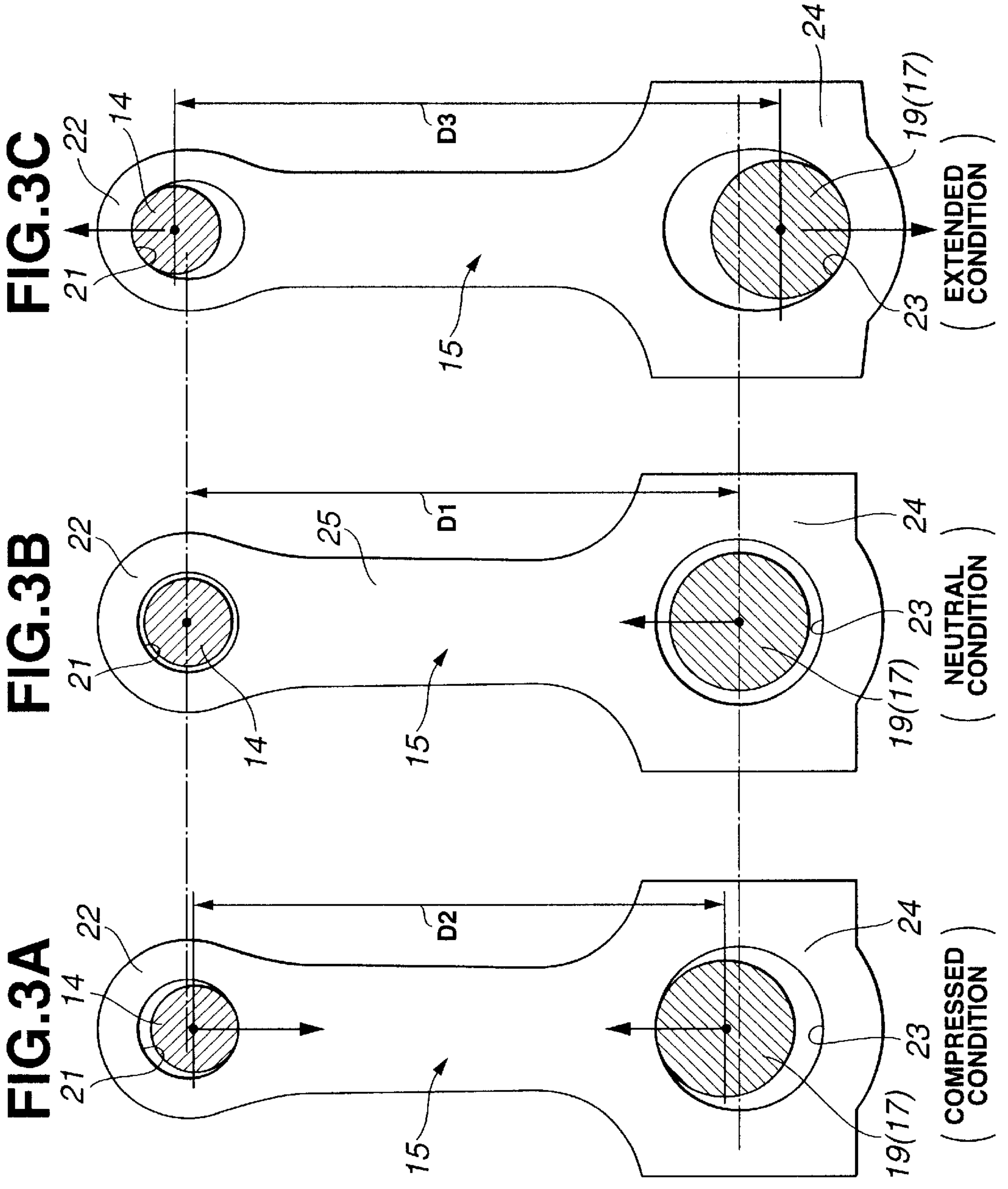
FIGS. 3A, 3B and 3C are illustrations of a control link, showing variation of elastic deformation depending on loading direction.
Figure 4:
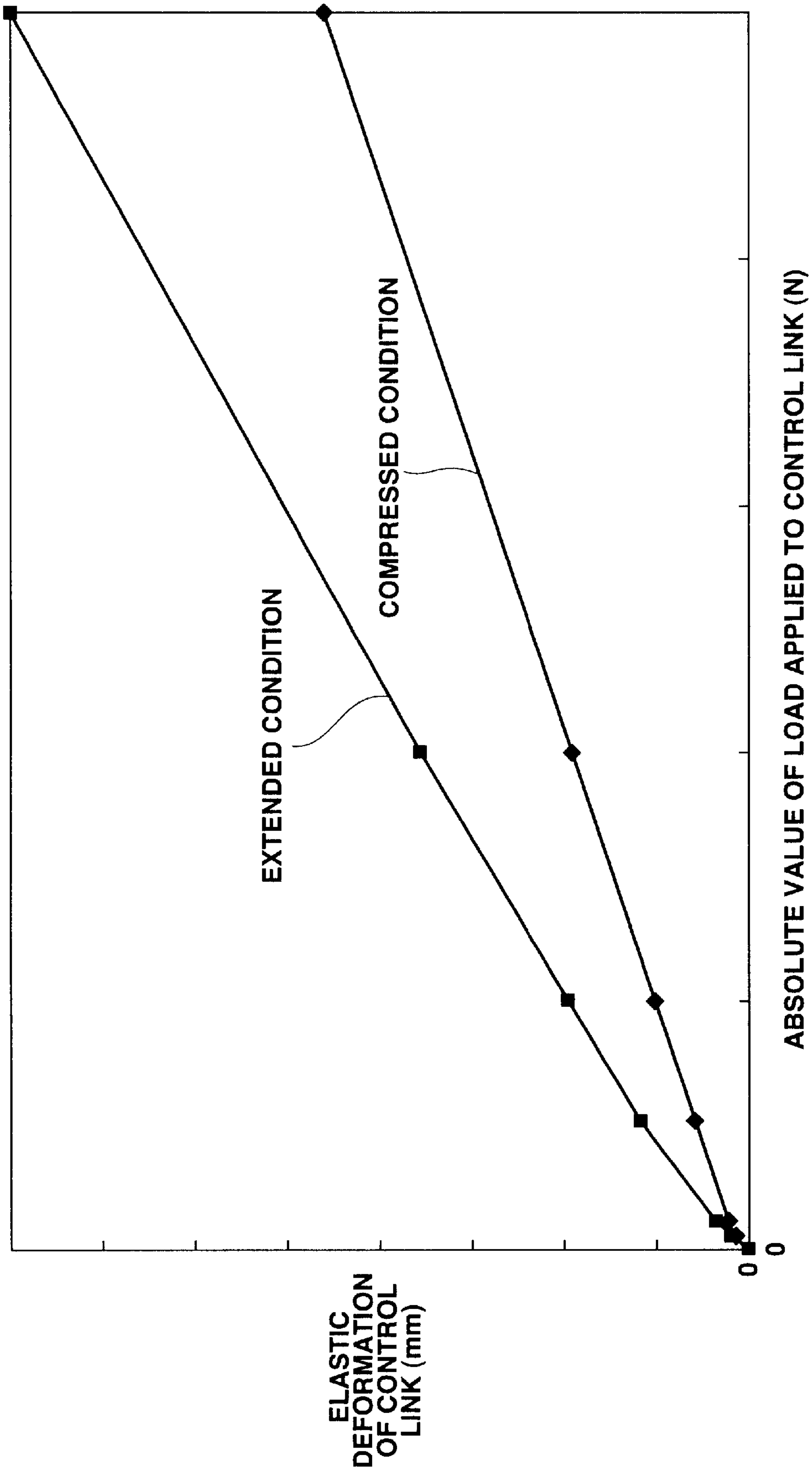
FIG. 4 is a graph showing a relation between a load applied to a control link and an elastic deformation appearing on the control link.

FIGS. 3A, 3B and 3C schematically show variation of elastic deformation of control link 15 that appears when a load is applied thereto in different directions. These drawings respectively show a compressed condition wherein control link 15 is applied with a compression load, a neutral condition wherein control link 15 has no load applied thereto and an extended condition wherein control link 15 is applied with a tensile load. For ease of understanding, control link 15 and deformation of the same are illustrated exaggeratingly.

As is seen from these drawings, control link 15 is formed at an upper boss portion (viz., first boss portion) 22 with the cylindrical bearing bore 21 through which second connecting pin 14 passes, and at a lower boss portion (viz., second boss portion) 24 with the cylindrical bearing bore 23 through which eccentric pin 19 passes.

If the distance between respective axes of pins 14 and 19 that pass through bores 21 and 23 of control link 15 is assumed as an effective length of control link 15, the effective length has the following tendency that depends on a direction in which a load is applied to control link 15.

That is, as is seen from the drawings, a difference between effective length D3 of link 15 in the extended condition and effective length D1 of link 15 in neutral condition is greater than that between effective length D2 of link 15 in the compressed condition and effective length D1 of link in neutral condition.

The reasons of this phenomenon may be as follows.

That is, in case of applying a compression load to control link 15 (viz., FIG. 3A), only a main shaft portion 25 of link 15 is compressed leaving upper and lower boss portions 22 and 24 not compressed. While, in case of applying a tensile load to control link 15 (viz., FIG. 3C), not only main shaft portion 25 but also upper and lower boss portions 22 and 24 of link 15 are extended axially outward, and thus, the above-mentioned phenomenon takes place.

As is known, when, under operation of the engine, piston 3 comes up to a top dead center (TDC) particularly on exhaust stroke, a remarked upward inertia load F1 (see FIG. 1) is applied to piston 3. This inertia load tends to bring piston 3 to a position closest to the intake and exhaust valves. Accordingly, when, due to valve overlapping or the like, the intake and exhaust valve are still open partially at such top dead center (TDC), piston 3 becomes much closer to the intake and exhaust valves increasing a possibility of undesirable contact of piston crown with the intake and exhaust valves.

In order to assuredly avoid such undesired contact, the following measures are practically employed in the first embodiment 100A of the present invention.

That is, as is seen from FIG. 1, at the time when piston 3 comes up to the top dead center (TDC), a downward load F2 applied to control link 15 caused by an upward inertial load F1 of piston 3 through upper link 13 and lower link 11 is adjusted to operate in a direction coincident with an imaginary line that extends through both center axis P3 of second connecting pin 14 and supporting axis P4 of control link 15 (viz., center axis P4 of eccentric pin 19. That is, piston control mechanism 100A of the first embodiment is so arranged that upon piston 3 reaching the top dead center (TDC), control link 15 is just applied with the compression load.

The measures of the first embodiment 100A will be much clearly understood from the following description.

Let us call an imaginary line perpendicularly crossing both center axis P1 of piston pin 4 and center axis P2 of first connecting pin 12 as an upper link center line 13A, an imaginary line perpendicularly crossing both center axis P3 of second connecting pin 14 and supporting axis P4 of control link 15 (viz., center axis P4 of eccentric pin 19) as a control link center line 15A, an imaginary line perpendicularly crossing both center axis P2 of first connecting pin 12 and center axis P6 of crank pin 2 as a first direction line H1 and an imaginary line perpendicularly crossing both center axis P3 of second connecting pin 14 and center axis P6 of crank pin 2 as a second direction line H2. As shown, in the first embodiment 100A, when piston 3 is at the top dead center (TDC), a rotation direction al of upper link center line 13A relative to first direction line H1 is equal to a rotation direction $\alpha$2 of control link center line 15A relative to second direction line H2.

When an upward load F3 is applied to lower link 11 along upper link center line 13A from upper link 13 based on upward inertial load F1, lower link 11 is applied with a torque about center axis P6 of crank pin 2 in the same direction as direction $\alpha$1. Since direction $\alpha$2 is set equal to direction $\alpha$1, a load applied to control link 15 according to the torque functions to compress control link 15, that is, to apply control link 15 with a compression load. It is to be noted that if the rotation direction of control link center line 15A relative to second direction line H2 is opposite to the above-mentioned direction $\alpha$1, the load would function to extend control link 15, that is, to apply control link 15 with a tensile load, which is not preferable.

As is understood from the above description, in the first embodiment 100A, when piston 3 comes up to the top dead center (TDC), control link 15 is applied with a compression load and thus, the elastic deformation of control link 15 is considerably reduced. This is very advantageous when piston comes up to the top dead center (TDC) on exhaust stroke. Accordingly, the above-mentioned undesirable upward displacement of piston 3 at the top dead center on exhaust stroke is suppressed, and thus, the possibility of undesirable contact of piston crown 3*a* with the intake and exhaust valves is suppressed. With this advantageous operation, there is no need of narrowing a range in which the engine compression ratio is varied, and thus, engine performance can be improved.

When now piston 3 is at the top dead center (TDC) on compression stroke wherein a downward load is applied to piston 3 due to the fuel combustion in combustion chamber, the load applied to the control link 15 functions to extend the same, that is, to apply the same with a tensile load. Thus, the elastic deformation of control link 15 becomes relatively large. However, since, in the compression stroke, both the intake and exhaust valves are kept closed and the load applied to piston 3 is directed downward, there is no possibility of contact of piston crown 3*a* with the intake and exhaust valves. Furthermore, lowering of thermal efficiency of the engine caused by such elastic deformation of control link 15 at the top dead center (TDC) on compression stroke is relatively small. That is, the deformation of control link 15 is not just a deformation but an elastic deformation that has an elastic energy as a potential energy. It is thought that, under operation of engine, part of energy produced as a result of fuel combustion in combustion chamber is stored in the engine body as the elastic energy, and when piston 3 comes down while reducing the load, the stored energy is used for assisting rotation of crankshaft 1.

In the following, elastic deformation of control crankshaft 17 will be described with reference to FIGS. 5 to 9B. It is to be noted that parts shown in these drawings are illustrated exaggeratingly for ease of understanding.

As is seen from FIG. 6A, in control crankshaft 17, center axis P4 of eccentric pin 19 to which lower end of control link 15 is pivotally connected is eccentric to center axis P5 of main shaft portion 18 of control crankshaft 17. Thus, under operation of engine, a certain bending moment is applied to control crankshaft 17 from control link 15. A bending deformation of control crankshaft 17 caused by such bending moment varies in accordance with a direction in which the load is applied to eccentric pin 19.

Figure 5:
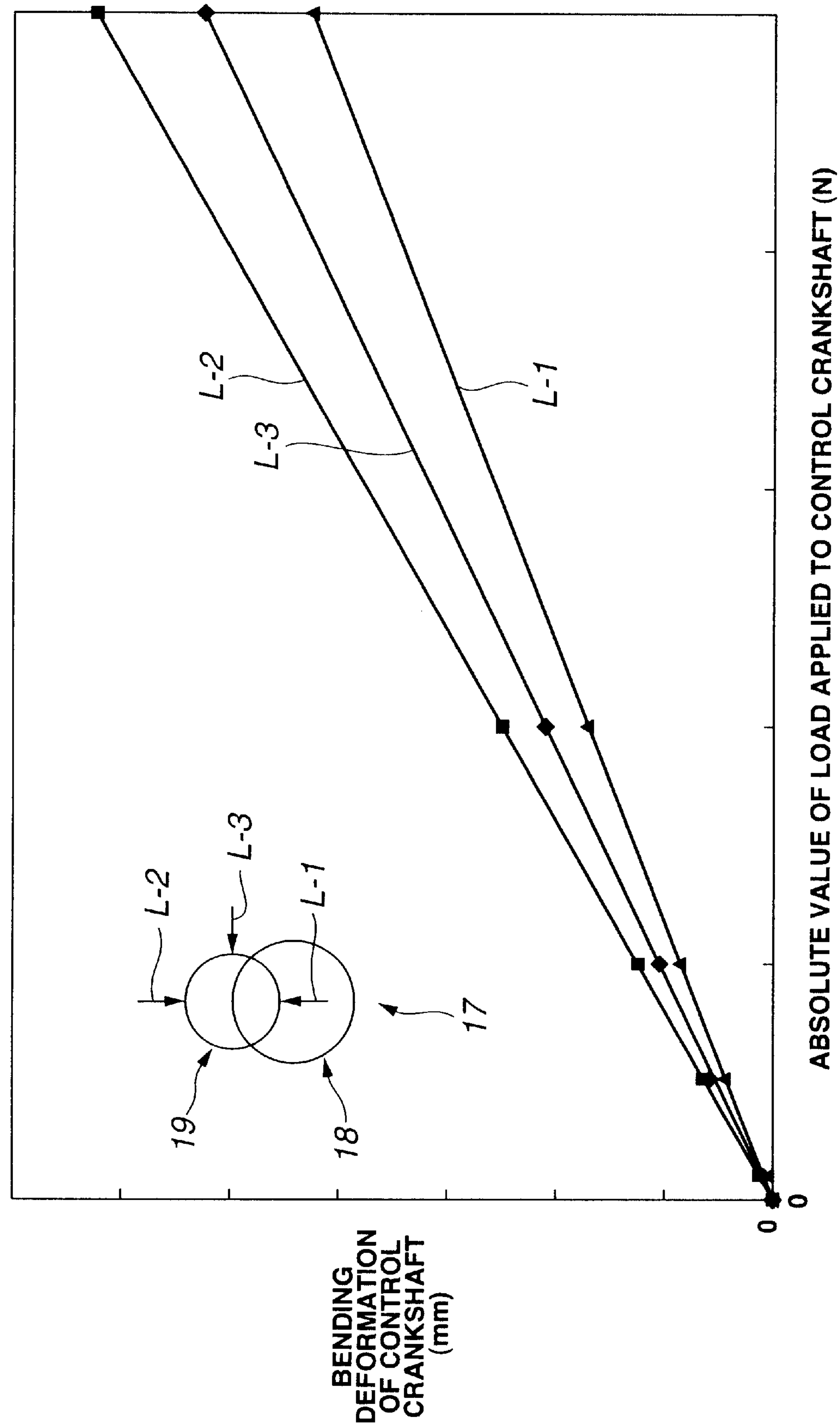
FIG. 5 is a graph showing a relation between a load inputted to a control crankshaft and a bending deformation appearing on the control crankshaft.

That is, as is seen from FIGS. 6A and 6B, in case wherein the load is directed from center axis P5 of main shaft portion 18 of control crankshaft 17 to center axis P4 of eccentric pin 19 of control crankshaft 17, the bending deformation of control crankshaft 17 exhibits the smallest value as is indicated by the characteristic line L-1 of graph of FIG. 5. While, as is seen from FIGS. 7A and 7B, in case wherein the load is directed from center axis P4 of eccentric pin 19 to center axis P5 of main shaft portion 18, the bending deformation of control crankshaft 17 exhibits the greatest value as is indicated by the characteristic line L-2 of FIG. 5. While, as is seen from FIGS. 8A and 8B, in case wherein the load is directed perpendicular to a third direction line H3 which perpendicularly extends across both center axis P5 of main shaft portion 18 and center axis P4 of eccentric pin 19, the bending deformation of control crankshaft 17 exhibits an intermediate value as is indicated by the characteristic line L-3 of FIG. 5.

The reason of this phenomenon will be described in the following with reference t FIGS. 9A and 9B.

Figure 9A:
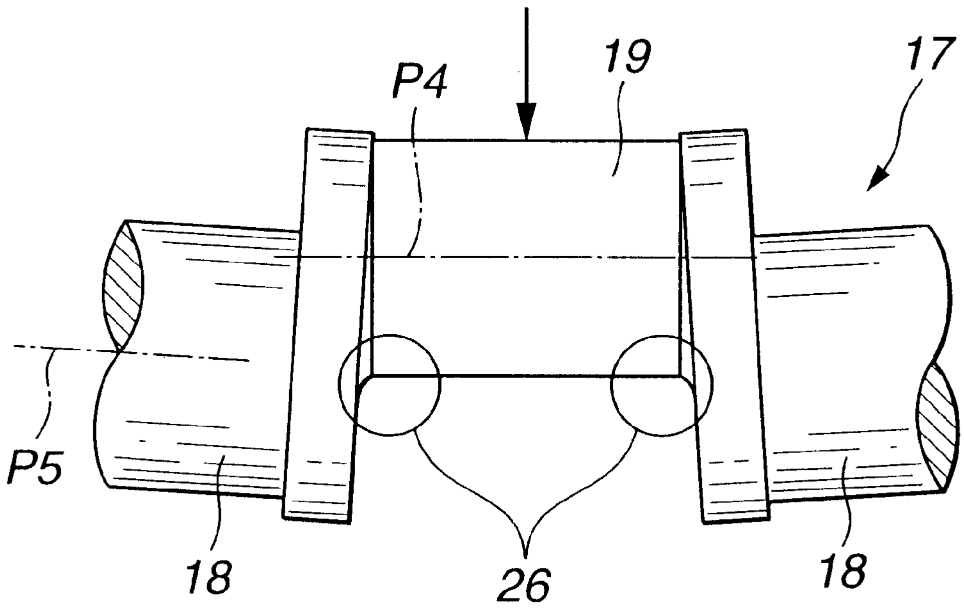
FIGS. 9A and 9B are partial front views of the unit including the control crankshaft and the control link, showing difference of bending deformation of control crankshaft depending on a direction in which a load is applied.
Figure 9B:
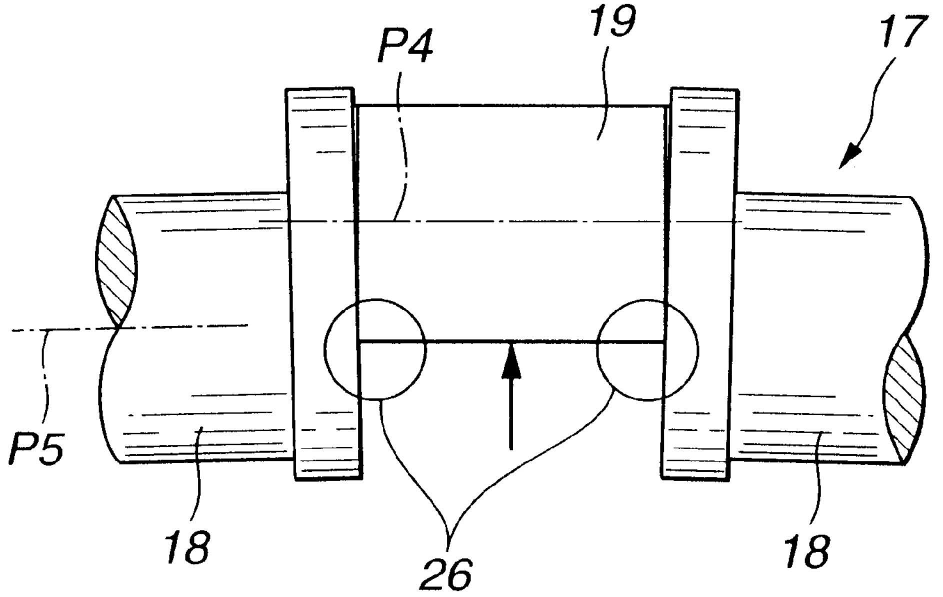

In case wherein as shown in FIG. 9A the load is directed from center axis P4 of eccentric pin 19 to center axis P5 of main shaft portion 18, eccentric pin 19 is applied at axial edges 26 of a radially inside part thereof with a tensile load and thus the bending deformation of control crankshaft 17 is large. Actually, control crankshaft 17 exhibits a lower rigidity at eccentric pin 19. While, in case wherein as shown in FIG. 9B the load is directed from center axis P5 of main shaft portion 18 to center axis P4 of eccentric pin 19, eccentric pin 19 is applied at axial edges 26 of the radially inside part thereof with a compression load and thus the bending deformation of control crankshaft 17 is small.

The bending deformation of control crankshaft 17 directly causes the undesired displacement of piston 3 from a proper position. Thus, when the bending deformation of control crankshaft 17 is large, piston 3 shows a marked displacement at the top dead center (TDC) on exhaust stroke, which tends to increase the possibility of inducting the undesired contact of piston crown 3*a* with the intake and exhaust valves. Since, in a higher compression ratio condition as shown in FIG. 1, the top dead center (TDC) of piston 3 is positioned higher than that in a lower compression ratio condition as shown in FIG. 2, such undesired possibility is increased.

In view of this, in the piston control mechanism of the first embodiment 100A, there is employed such a measure that in the higher compression ratio condition the bending deformation of control crankshaft 17 at the top dead center (TDC) of piston 3 is made smaller than that in the lower compression ratio condition. More specifically, the bending deformation of control crankshaft 17 at the top dead center of piston 3 is gradually reduced as the compression ratio set is increased.

That is, as will be understood when comparing the drawings of FIGS. 1 and 2, a so-called eccentric angle θH defined between third direction line H3 (see FIG. 8B) and control link center line 15A at the top dead center of piston 3 in the higher compression ratio condition (FIG. 1) is set smaller than an eccentric angle θL defined in the lower compression ratio condition (FIG. 2).

Accordingly, when, under the higher compression ratio condition, piston 3 comes up to the top dead center (TDC), the bending deformation of control crankshaft 17 is sufficiently restrained thereby suppressing or at least minimizing undesired upward displacement of piston 3 from its proper position (viz., regulated top dead center). Thus, undesired contact of piston crown 3*a* with the intake and exhaust valves is assuredly prevented. This means permission of enlargement of the range in which the engine compression ratio can be varied.

Furthermore, as is seen from FIGS. 1 and 2, in the first embodiment 100A, when piston 3 is at the top dead center, center axis P2 of first connecting pin 12 and center axis P3 of second connecting pin 14 are positioned at opposite sides with respect to an imaginary plane B that includes center axis P6 of crank pin 2 of crankshaft 1 and is parallel with an axis of a piston cylinder 6 of the engine, and supporting axis P4 of control link 15 is positioned below center axis P3 of second connecting pin 14.

Accordingly, control crankshaft 17 whose eccentric pin 19 passes through the lower end of control crankshaft 15 can be located in an obliquely lower zone of crankshaft 1 in cylinder block 5, which usually offers a larger space. Thus, control crankshaft 17 and its associated parts can be compactly and readily installed in cylinder block 5 without changing the shape of the same.

Figure 10:
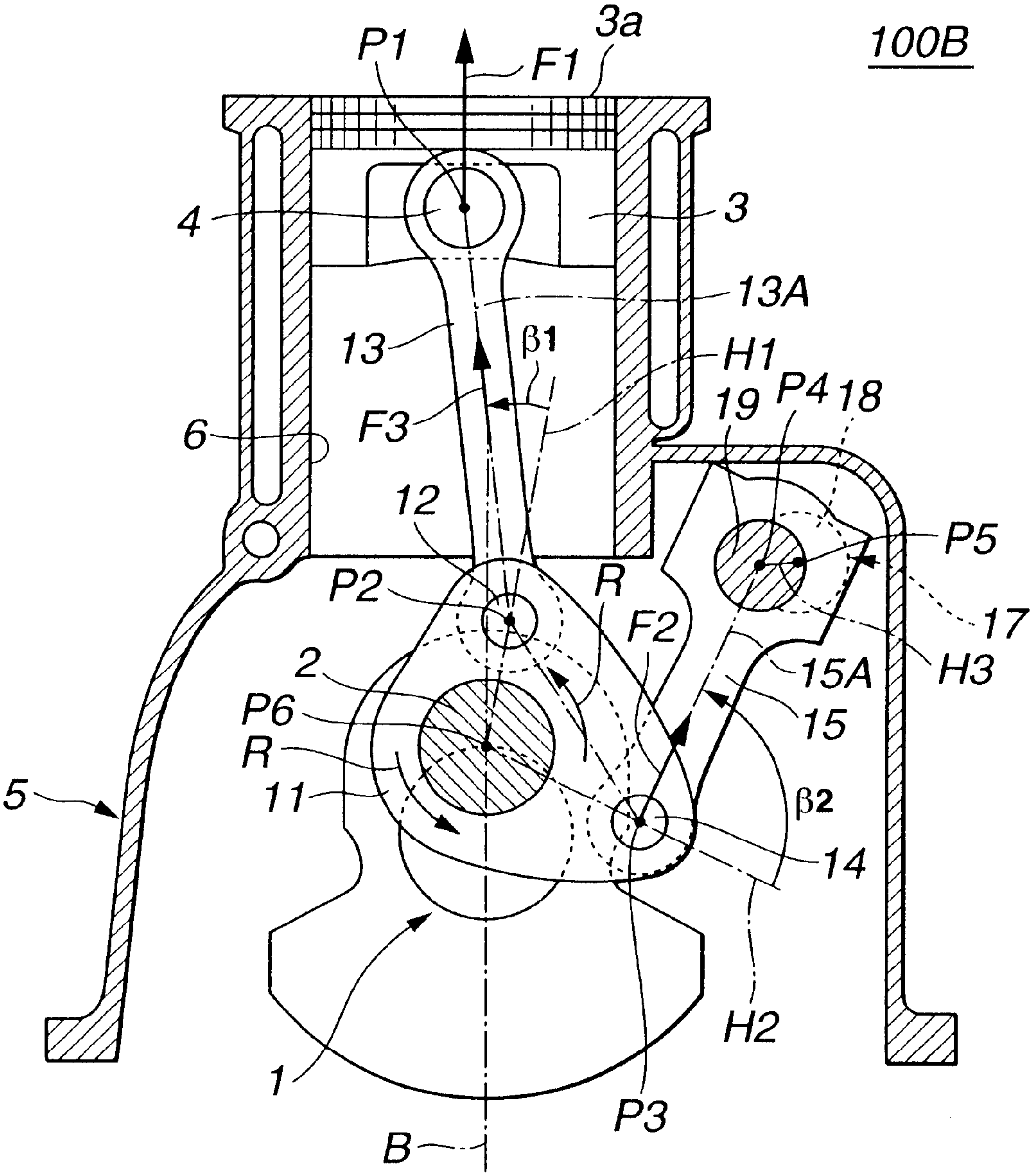
FIG. 10 is a view similar to FIG. 1, but showing a second embodiment of the present invention.

Referring to FIG. 10, there is shown a piston control mechanism 100B of a second embodiment of the present invention.

In this embodiment 100B, when piston 3 is at the top dead center (TDC), center axis P2 of first connecting pin 12 and center axis P3 of second connecting pin 14 are positioned at the same side with respect to the imaginary plane B that includes center axis P6 of crank pin 2 of crankshaft 1 and is parallel with the axis of cylinder 6 of the engine, and supporting axis P4 of control link 15 is positioned above center axis P3 of second connecting pin 14. That is, control link 15 extends diagonally upward from lower link 11, which causes positioning of control crankshaft 17 above crankshaft 1. Thus, as compared with the above-mentioned first embodiment 100A, the second embodiment 100B is somewhat poor in layout.

However, also in the second embodiment 100B, when piston 3 is at the top dead center (TDC), a rotation direction P1 of upper link center line 13A relative to first direction line H1 is equal to a rotation direction β2 of control link center line 15A relative to second direction line H2. Accordingly, when piston 3 comes up to dead top center on exhaust stroke, a load F2 applied to control link 15 functions to compress the same and thus bending deformation of control crankshaft 17 is minimized thereby suppressing or at least minimizing undesired upward displacement of piston 3 at the top dead center. Thus, possibility of undesirable contact of piston crown 3*a* with the intake and exhaust valves is suppressed.

Figure 11:
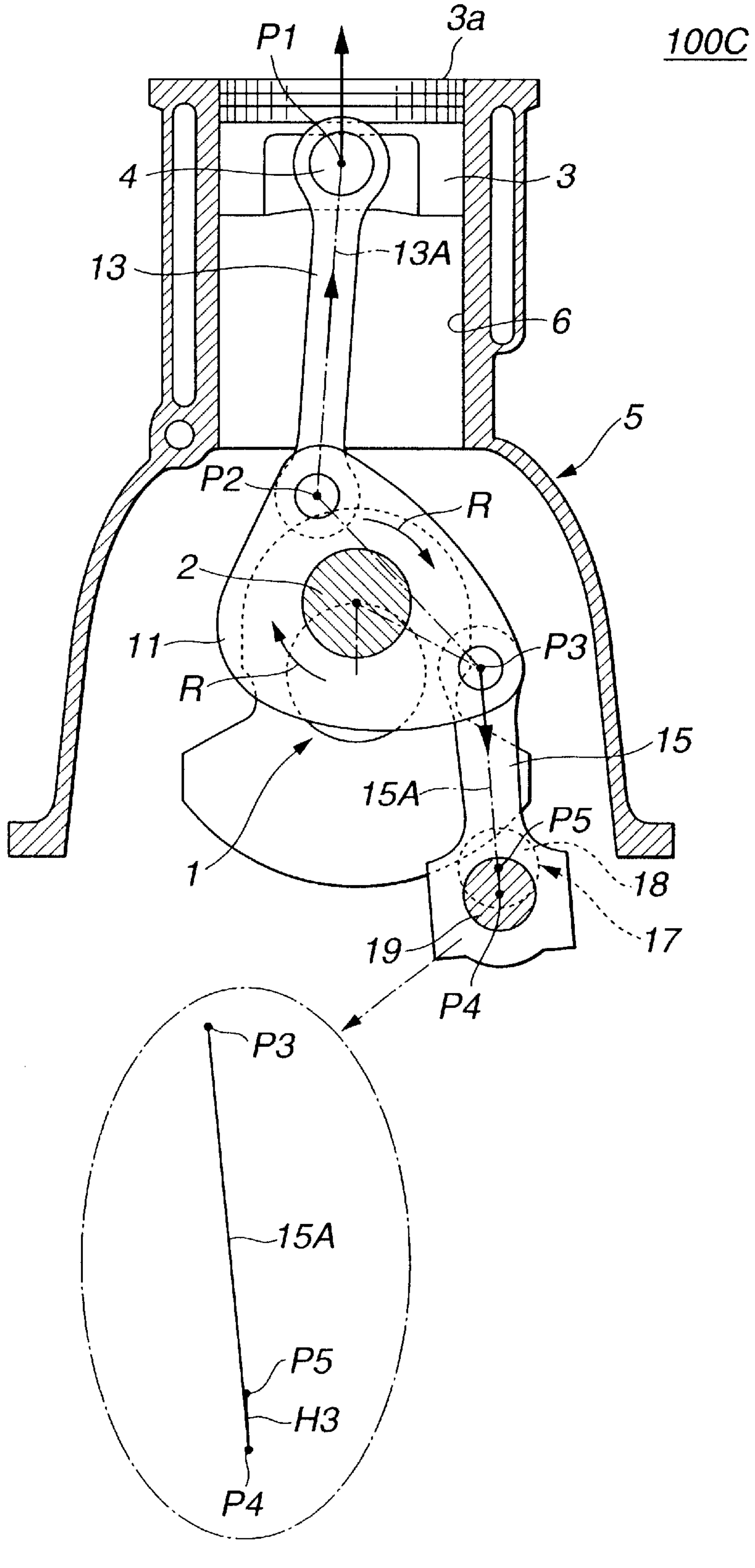
FIG. 11 is a view similar to FIG. 1, but showing a third embodiment of the present invention.
Figure 12:
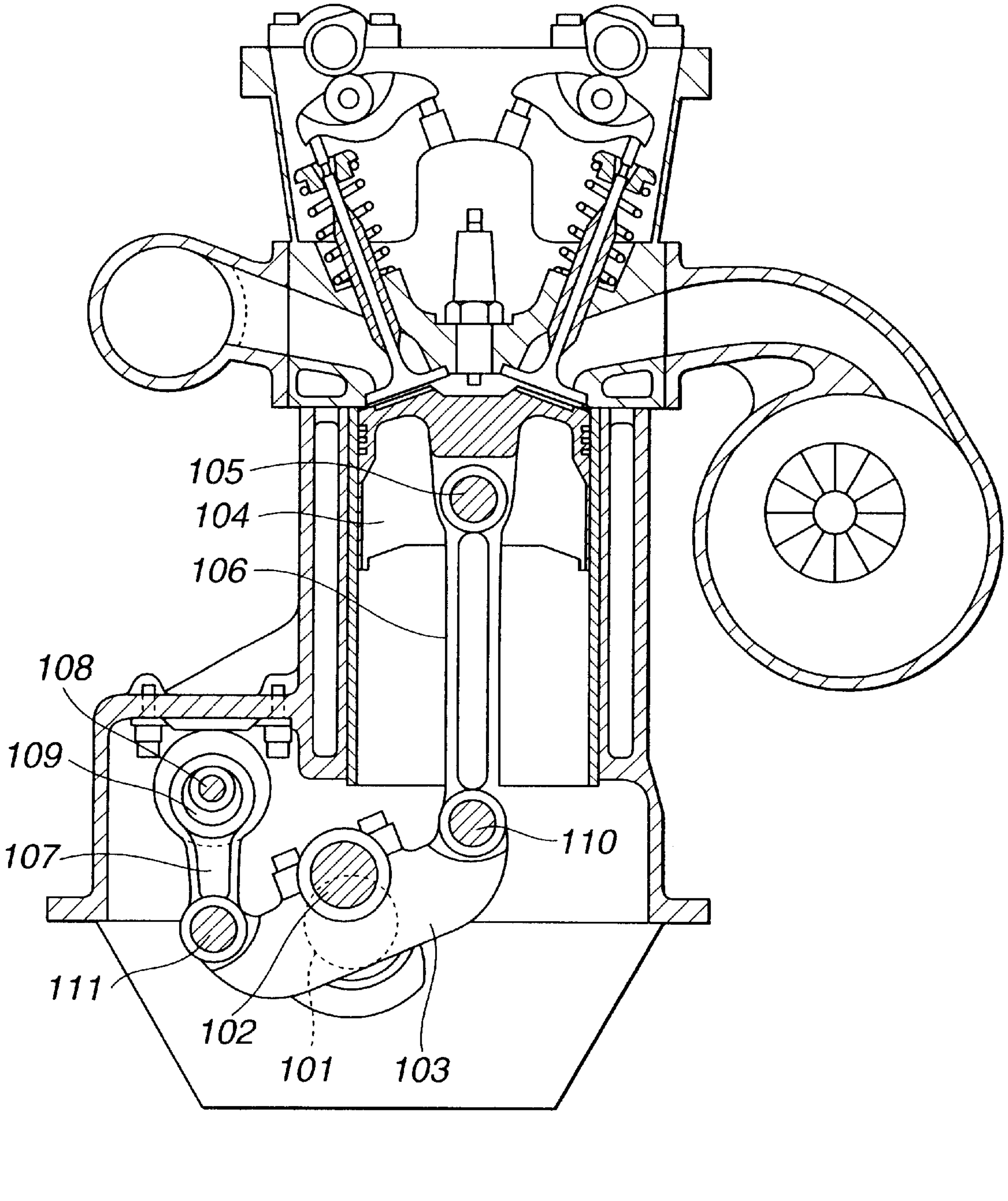
FIG.12 (RELATED ART)
FIG. 12 is a sectional view of an internal combustion engine of known variable compression ratio type.

Referring to FIG. 11, there is shown a piston control mechanism 100C of a third embodiment of the present invention.

In this third embodiment 100C, when, under a higher compression ratio condition, piston 3 comes up to the top dead center on exhaust stroke, the eccentric angle θH defined between third direction line H3 (see FIG. 8B) and control link center line 15A is set 0 (zero) degree. Accordingly, in this third embodiment 100C, under the condition wherein piston crown 3*a* comes to a position closes to the intake and exhaust valves, the bending deformation of control crankshaft 17 is most effectively suppressed and thus the possibility of contact of piston crown 3*a* with the intake and exhaust valves is assuredly suppressed.

The entire contents of Japanese Patent Application 2001-091742 filed Mar. 28, 2001 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A piston control mechanism of an internal combustion engine, said engine including a piston slidably disposed in a piston cylinder and a crankshaft converting a reciprocation movement of said piston to a rotation movement, said piston control mechanism comprising:

a lower link rotatably disposed on a crank pin of said crankshaft;

an upper link having one end pivotally connected to said lower link and the other end pivotally connected to said piston;

a control link having one end pivotally connected to said lower link; and a position changing mechanism which changes a supporting axis about which the other end of said control link turns, wherein when said piston comes up to a top dead center, a compression load is applied to said control link in an axial direction of the control link in accordance with an upward inertial load of said piston.

2. A piston control mechanism as claimed in claim 1, in which said compression load is applied in a direction from a pivot axis between said lower link and said control link to said supporting axis.

3. A piston control mechanism as claimed in claim 2, in which when said piston comes up to the top dead center, a rotation direction of an upper link center line relative to a first direction line is equal to a rotation direction of a control link center line relative to a second direction line, said upper link center line being an imaginary line which perpendicularly crosses both a first pivot axis between said piston and said upper link and a second pivot axis between said upper link and said lower link, said control link center line being an imaginary line which perpendicularly crosses both a third pivot axis between said lower link and said control link and said supporting axis, said first direction line being an imaginary line which perpendicularly crosses both said second pivot axis and a center axis of said crank pin, and said second direction line being an imaginary line which perpendicularly crosses both said third pivot axis and said center axis of said crank pin.

4. A piston control mechanism as claimed in claim 3, in which said supporting axis is positioned more remote from said piston than said third pivot axis.

5. A piston control mechanism as claimed in claim 1, in which said position changing mechanism comprises:

a control crankshaft which extends in parallel with said crankshaft and rotates about a given axis, said control crankshaft including a main shaft portion which is rotatable about said given axis and an eccentric pin which is radially raised from said main shaft portion, said eccentric pin being received in a cylindrical bearing bore formed in the other end of said control link; and an electric actuator which rotates said control crankshaft about said given axis with the electric power.

6. A piston control mechanism as claimed in claim 5, in which said electric actuator is energized to rotate said control crankshaft when changing of engine compression ratio is needed.

7. A piston control mechanism as claimed in claim 6, in which an eccentric angle defined between a third direction line and said control link center line at the top dead center of the position in a higher compression condition of the engine is smaller than a corresponding eccentric angle defined and established in a lower compression ratio condition, said third direction line being an imaginary line which perpendicularly extends across both the given axis of said main shaft portion and a center axis of said eccentric pin.

8. A piston control mechanism as claimed in claim 7, in which when, under the higher compression condition of the engine, said piston comes up to the top dead center, said eccentric angle is set substantially 0 (zero) degree.

9. A piston control mechanism as claimed in claim 4, in which when said piston is at the top dead center, said second pivot axis and said third pivot axis are positioned at opposite sides with respect to an imaginary plane which includes a center axis of a crank pin of said crankshaft and is parallel with an axis of a piston cylinder of the engine.

10. A piston control mechanism as claimed in claim 3, in which said supporting axis is positioned closer to piston than said third pivot axis.

11. A piston control mechanism as claimed in claim 10, in which when said piston is at the top dead center, said second pivot axis and said third pivot axis are positioned at the same side with respect to an imaginary plane which includes a center axis of a crank pin of said crankshaft and is parallel with an axis of a piston cylinder of the engine.

12. A piston control mechanism of an internal combustion engine, said engine including a piston slidably disposed in a piston cylinder and a crankshaft converting a reciprocation movement of said piston to a rotation movement, said piston control mechanism comprising:

a lower link rotatably disposed on a crank pin of said crankshaft;

an upper link having one end pivotally connected to said lower link and the other end pivotally connected to said piston;

a control link having one end pivotally connected to said lower link; and a position changing mechanism including a control crankshaft which extends in parallel with said crankshaft and rotates about a given axis, said control crankshaft including a main shaft portion which is rotatable about said given axis and an eccentric pin which is radially raised from said main shaft portion, said eccentric pin being received in a cylindrical bearing bore formed in the other end of said control link, wherein when said piston comes up to a top dead center, a rotation direction of an upper link center line relative to a first direction line is equal to a rotation direction of a control link center line relative to a second direction line, said upper link center line being an imaginary line which perpendicularly crosses both a first pivot axis between said piston and said upper link and a second pivot axis between said upper link and said lower link, said control link center line being an imaginary line which perpendicularly crosses both a third pivot axis between said lower link and said control link and said supporting axis, said first direction line being an imaginary line which perpendicularly crosses both said second pivot axis and a center axis of said crank pin, and said second direction line being an imaginary line which perpendicularly crosses both said third pivot axis and said center axis of said crank pin.

* * * * *